United States Patent [19]

Dougherty

[11] Patent Number: 5,539,624
[45] Date of Patent: Jul. 23, 1996

[54] ILLUMINATED HOSE

[75] Inventor: Robert C. Dougherty, Tucson, Ariz.

[73] Assignee: Durodyne, Inc., Tucson, Ariz.

[21] Appl. No.: 374,031

[22] Filed: Jan. 17, 1995

[51] Int. Cl.[6] .............................. F21V 8/00; B64D 39/00
[52] U.S. Cl. ........................... 362/32; 362/62; 362/101;
362/293; 362/61; 222/113; 244/135 A
[58] Field of Search .................................... 385/115, 100,
385/901; 362/32, 62, 96, 101, 253, 806,
249, 252, 234, 230, 231, 293, 61; 244/135 A

[56] References Cited

U.S. PATENT DOCUMENTS

| | | | |
|---|---|---|---|
| 3,463,595 | 8/1969 | Blanc et al. | 362/32 X |
| 3,535,018 | 10/1970 | Vasilatos | 362/32 X |
| 3,723,722 | 3/1973 | Van Iderstine et al. | 362/32 |
| 4,158,885 | 6/1979 | Neuberger . | |
| 4,288,845 | 9/1981 | Finsness . | |
| 4,380,788 | 4/1983 | Korski . | |
| 4,398,685 | 8/1983 | Task . | |
| 4,420,740 | 12/1983 | Brown . | |
| 4,859,026 | 8/1989 | Arents . | |
| 5,326,052 | 7/1994 | Krispin | 244/135 A |
| 5,333,228 | 7/1994 | Kingstone | 385/100 |
| 5,333,639 | 8/1994 | Nelson | 362/101 |
| 5,386,489 | 1/1995 | Stokes | 362/32 X |

*Primary Examiner*—James C. Yeung
*Assistant Examiner*—Thomas M. Sember
*Attorney, Agent, or Firm*—Ogram & Teplitz

[57] ABSTRACT

An enhanced hose for use in fuel transfer and the like. Embedded within the hose's body are fiber-optic fibers in which light is transmitted. At predefined locations on the hose, selected portions of said fiber-optic fibers are exposed and structured to permit light to escape. Structuring of the fiber-optic fibers to permit light to escape is done by: terminating the fiber at that point, removing the cladding on the fiber at that point, or by creating a radical bend in the fiber. The intensity of the light escaping from the fiber-optic fibers is easily controllable by adjustment of the light source's intensity which feeds the light into the fiber-optic fibers. Additionally, compensation is made so that elongation of the hose does not break the fibers. Since no electrical current is being used, the enhanced hose is particularly useful for illuminating the exterior of a hose which is conveying explosive materials such as fuel. The enhanced hose is particularly useful for aerial refueling; but, numerous other applications exist including ship-to-ship, ship-to-shore, and ship-to-shore fueling, as well as low visibility diving operations.

30 Claims, 4 Drawing Sheets

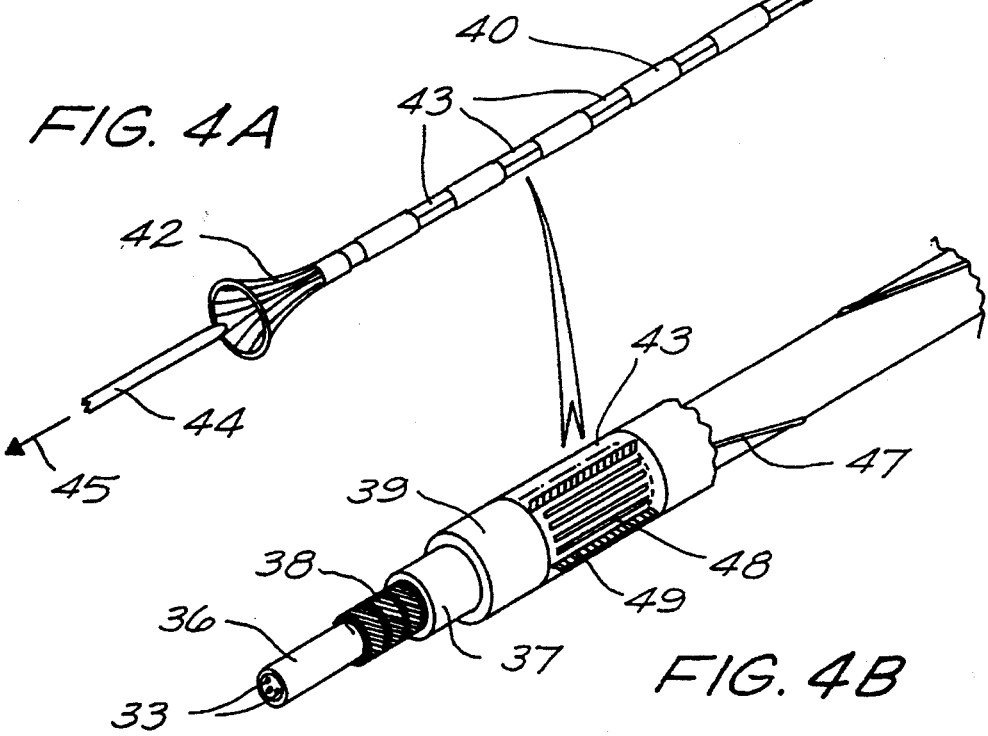

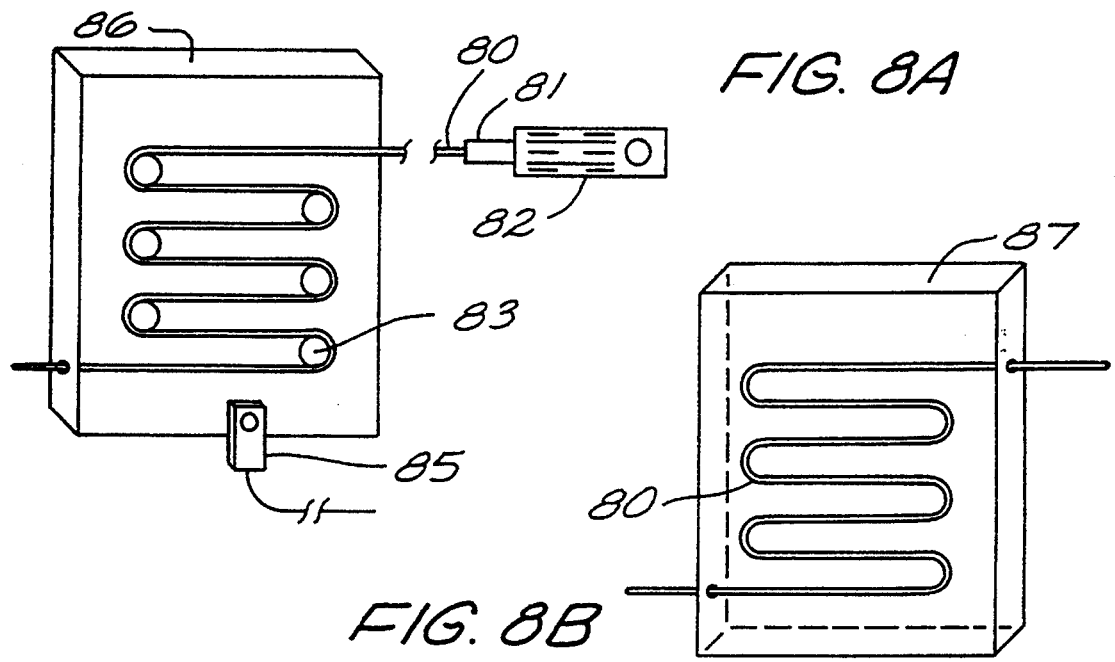
FIG. 8A
FIG. 8B
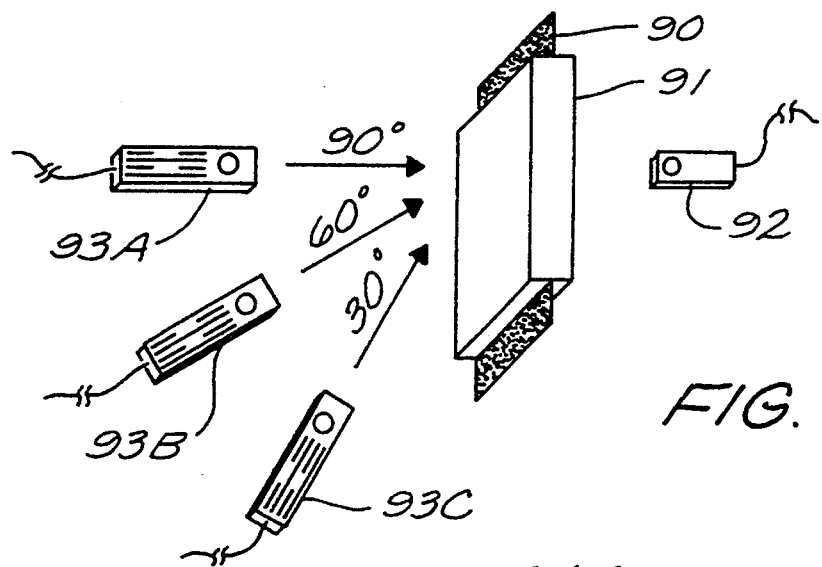
FIG. 9
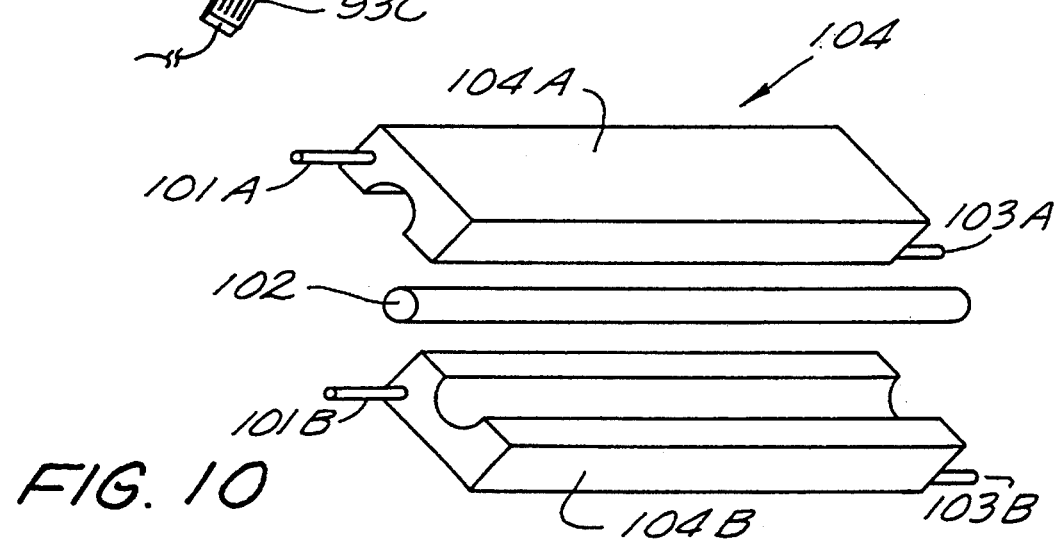
FIG. 10

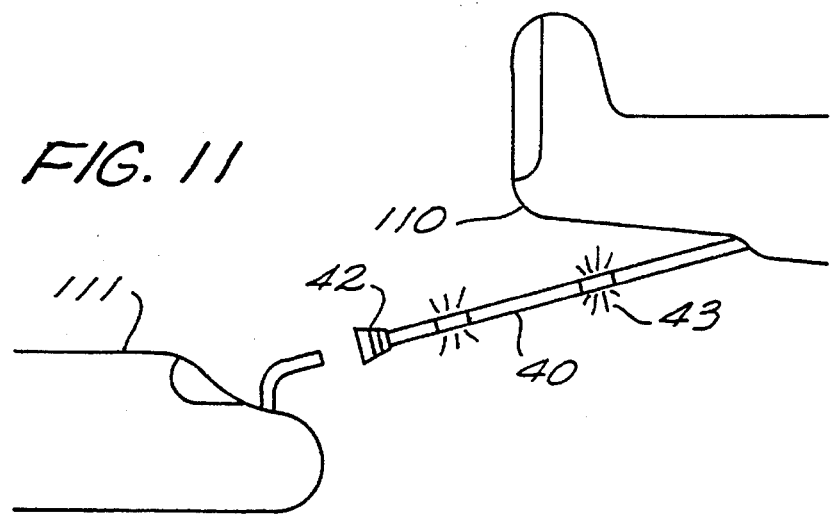
FIG. 11
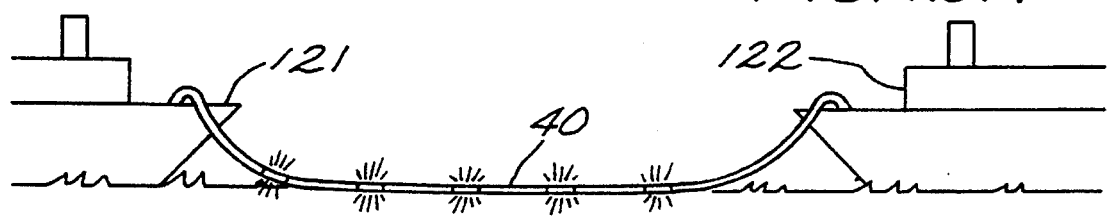
FIG. 12A
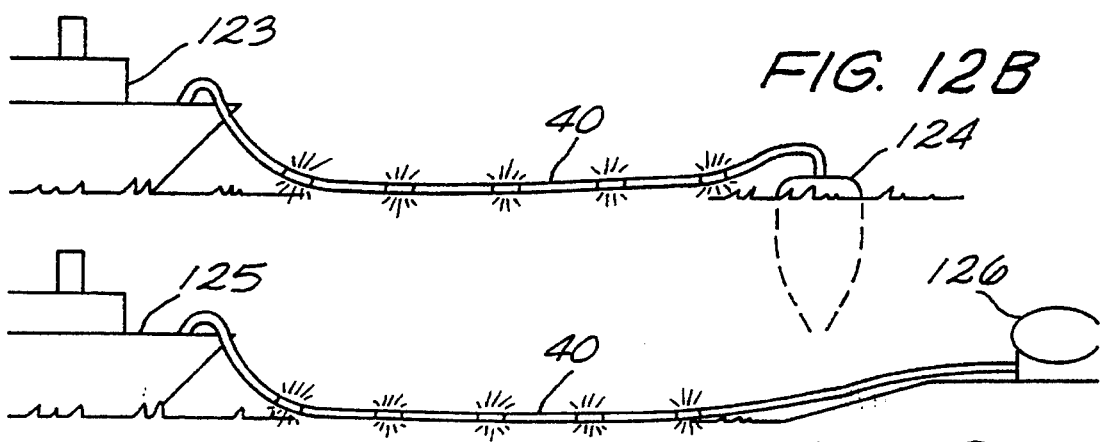
FIG. 12B
FIG. 12C
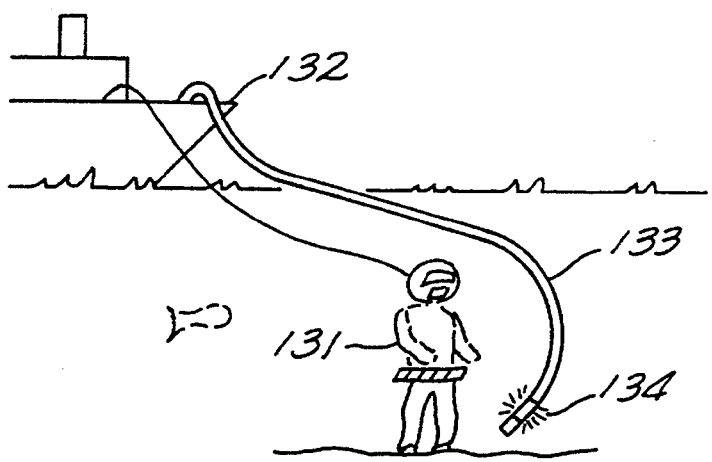
FIG. 13

ILLUMINATED HOSE

BACKGROUND OF THE INVENTION

This invention relates generally to hoses and more particularly to hoses which are used in dim or unlighted environments.

Proper illumination of hoses has caused a great deal of problems, especially for hoses which carry combustibles or explosive materials.

Electricity, which could spark an explosion, must be avoided; the possibility of placing electrical lights on fuel hose itself is therefore avoided as being unsafe.

This is especially true for aerial refueling which is done at all hours of the day. In aerial refueling, the hose is typically marked with white bands which extend around the hose and give the pilot and operator ready visual cues. During daylight hours, aerial refueling has become relatively risk-free.

During night refueling though, these white bands are not readily discernable. The ability of the pilot to see the hose for proper positioning is thereby dramatically diminished.

To assist in this task, a variety of devices have been developed, including: U.S. Pat. No. 4,288,845, entitled "Aerial Refueling Receptacle Floodlights-Spoiler and Fuselage, Nose Mounted" issued to Finsness et al. on Sep. 8, 1981; U.S. Pat. No. 4,633,376, entitled "Advanced Fuel Receptacle Lighting System for Aerial Refueling" issued to Newman on Dec. 30, 1986; U.S. Pat. No. 4,398,685, entitled "Aerial Day/Night Refueling Stations" issued to Task et al. on Aug. 16, 1983; and U.S. Pat. No. 4,380,788, entitled "Aerial Refuel Floodlight" issued to Korski on Apr. 19, 1983.

In all of these situations, the technical approach has been to distance the light source from the hose and shine high intensity or flood-lights onto the dangling hose. Although this approach does reduce the risk of an explosive mixture of electricity and fuel, these lights have devastating affects upon the night-vision of the pilot and also create a highly visible "target" for the enemy. Because of this, these techniques have been generally avoided in combat conditions.

The visibility of the refueling hose is critical in combat situations. Use of visible, ultraviolet, or infrared markings or illumination which could be detectable by the enemy and could be used for targeting purposes cannot be allowed.

The same problem also exists for hoses used to transfer fuel and other liquids from or to a ship, as in ship-to-ship or ship-to-shore operations. The relative motion between the source reservoir and the receiving vehicle makes sighting of the hose by the operator imperative, but, during nighttime, the task becomes impossible without excessive external lighting. Due to the inability to see the hose floating on the water, it is frequently damaged by other ships.

Another major problem area exists in diving, salvage, and rescue operations. In night dives, deep water dives, or murky/muddy water, the ability to see a particular hose enhances the entire operation by increasing productivity and safety.

It is clear from the foregoing that there is a definite need for identifying a hose during dim light conditions that does not increase the possibility of enemy detection during the hose's use.

SUMMARY OF THE INVENTION

The invention is an enhanced hose for use in fuel transfer and the like. Embedded within the hose's body are optical fibers in which light is transmitted. At predefined locations on the hose, selected portions of said fiber-optic fibers are exposed/visible and structured to permit the light to escape.

Although portions of this discussion relate to aerial refueling, the invention is not to be limited to this sole application. Other applications, such as ship-to-ship and ship-to-shore refueling and diving operations are also contemplated.

Structuring of the optical fibers to permit light to escape is done by: terminating the fiber at that point; removing the cladding on the fiber at that point; or by creating a radical bend in the fiber.

Preferably, each fiber has two parts. At the center of the fiber is the core which carries the light. These cores can be as small as eight microns; but, the preferred embodiment uses a much larger core as more light per strand can be transmitted. Surrounding the core is a concentric layer called the cladding. The index of refraction for the cladding is different than the core's; this causes total reflection of the light within the core.

In one embodiment of the invention, bundles of optical fibers are spirally wound within the hose's body and are patterned at strategic locations to shine though a translucent window of the hose's exterior wall.

It is well established that waves within an optical fiber are directionally controlled by the deviation of linearity in the wave guide. Where the wave guide wall is a cladding with a refractive index close to that of the carrier fiber, portions of the carrier light is transmitted through the cladding. The color and intensity of the "escaped" light is a function of the degree of bending in the fibers, the structure of the carrier light, and the refractive index of the cladding.

In one embodiment, during the production of the hose and by selective bending of the fibers, a portion of the optical fiber is patterned in a radical bend. This creates a glow at chosen frequencies and colors in a specified location.

This approach is further enhanced in one embodiment of the invention in which selective colors are generated to assist the pilot in positioning of the aircraft to mate with the refueling hose. By placing a Fresnel film over each quadrant on the hose, the pilot is able to judge his approach by the visible light. As example: approaching the starboard has an orange light associated with that direction (a combination of yellow and red); a high approach is signaled by a green (yellow combined with blue); etc.

In one embodiment, the light creation is accomplished by simply terminating selected fibers in the desired forms.

In another embodiment of the invention, the cladding is removed in strategic locations. This removal of the cladding permits the light within the fiber to "escape" and be visible.

Although glass can be used as the cladding, the preferred embodiment utilizes plastics due to its enhanced flexibility. This aspect is particularly advantageous since the hose is typically spooled during non-use. Plastic coated fibers more easily withstand the required and repetitive winding and unwinding without breaking.

During operation, the intensity of the light escaping from the fiber-optic fibers is easily controllable by adjustment of the light source's intensity which feeds the light into the optical fibers.

Those of ordinary skill in the art readily recognize a variety of methods of focusing and controlling the light source so that its light enters the fibers.

Of particular importance in maintaining the integrity of the fibers is consideration for elongation of the hose during its use. There must be compensation so that elongation of the hose does not break the fibers. This is accomplished through a variety of techniques.

As the hose is an elastic member, it may elongate, neck down, and/or swell or shrink due to internal pressures and external loads. Due to the fact that the glass fiber has no appreciable stretch, the hose must be designed at a neutral angle under anticipated internal and external loads, so it neither swells or stretches, shrinks or necks down enough to fracture the glass fibers.

Since no electrical current is being used at the hose itself, the enhanced hose creates safe and controllable illumination for the exterior of a hose.

A further enhancement to the hose's use is that once a connection is made between the reservoir (refueler aircraft) and the targeted vehicle, a secure, non-electrical link is created between the two via the fibers themselves. In this manner, the two vehicles are able to communicate using simple light pulses and avoid any danger of causing a fire or explosion.

The enhanced hose is particularly useful for in-flight fuel transfer between two aircraft; but, numerous other applications exist, including ship-to-ship fueling, and ship-to-shore fueling. Those of ordinary skill in the art readily recognize various other situations which are applicable for the apparatus of this invention.

The invention together with various embodiments thereof will be more fully explained by the accompanying drawings and the following descriptions.

DRAWINGS IN BRIEF

FIG. 1 is a graph explaining the properties being applied for light transfer within a fiber-optic fiber.

FIGS. 2A, 2B, and 2C are lateral, end, and side views respectively of a single fiber used in the preferred embodiment.

FIG. 3 is side view of an embodiment of the invention in which the fiber is bent at a radical angle to permit light to escape from the fiber.

FIGS. 4A and 4B are perspective views of an embodiment of the invention.

FIGS. 8A and 8B illustrate an embodiment of the apparatus used to engineer and design a light box for release of light from the fiber-optic fibers to determine light release at varying bend radii.

FIG. 9 shows an apparatus used to evaluate varying luminescent materials to be used in manufacture of the light emitting apparatus.

FIG. 10 illustrates a production embodiment used in the manufacture of the invention.

Figure 5:
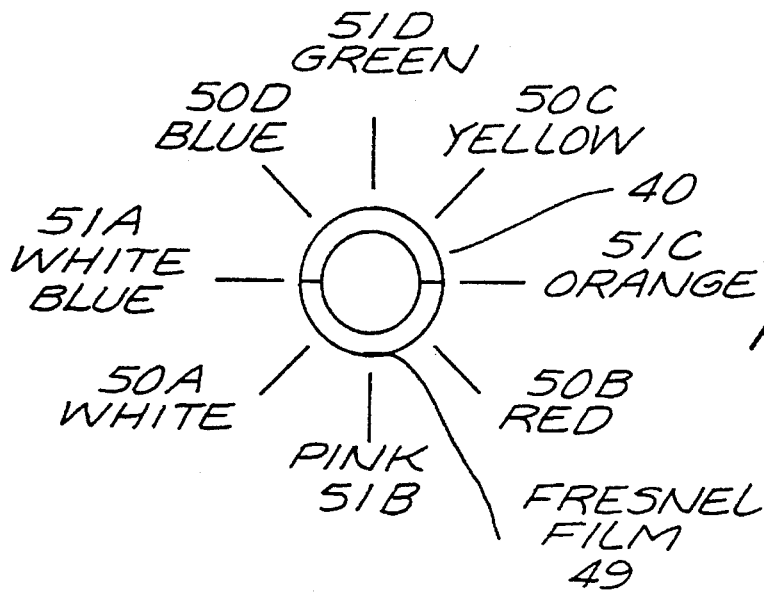
FIG. 5 is an end view of an embodiment of the invention showing the embodiment's use of colors for alignment of the hose during the coupling operation.

FIG. 11 graphically illustrates the improved hose used in aerial refueling.

FIGS. 12A, 12B, and 12C graphically illustrates the improved hose used in ship-to-ship, ship-to-buoy, and ship-to-shore, respectively, fluid transfer.

FIG. 13 graphically illustrates an embodiment of the present invention used in an underwater application.

DRAWINGS IN DETAIL

FIG. 1 is a graph explaining the properties being applied for light transfer within a fiber-optic fiber.

When a ray of light propagates through different mediums with different optical properties, the light refracts according to Snells' Law. Hence:

$$n_1 \sin \Theta_1 = n_2 \sin \Theta_2$$

Referring to FIGS. 2A, 2B, 2C, and 3 simultaneously, light incident to the surface is bent at an angle of $\Theta_2$. This bend is proportional to the index of refractions of the materials ($n_1$ & $n_2$). Rays entering a higher index medium from a lower index bends towards the normal and vice versa. This is evident from the figure above. If a ray is normal to the interface, it passes right through the medium without bending. In the case where $n_1 > n_2$ and the incident beam is at an angle greater that the critical angle $\Theta_0$ the light is totally reflected. If a source is in an n optically dense medium and $\Theta_1$, (the incident angle) is increased gradually, the transmitted ray approaches the tangent with the boundary. When the transmitted beam reaches 90°, the incident beam reaches the critical angle, the incoming energy is reflected totally into the incident medium. This effect is known as total internal reflection, and is the basic law of propagation which allows fiber optics to work.

A step index fiber is the most common fiber. Core 20 of the fiber has a higher index than cladding 21. This structure allows light to be trapped by total internal reflection at the boundary of the cladding 21. If the cladding layer 21 wasn't present, the fiber would experience high losses due to impurities at the core 20 surface. With cladding 21 present, a ray of light less than the critical angle, travels down a fiber.

Light leaks or is transmitted into the cladding layer of the glass. These cladding modes are the rays of light which cause the fiber to glow and is visible from the outside of the fiber. Light traveling in the cladding layer attenuate more rapidly than in the core because of the outer surface losses.

Macroscopic bends, large scale bending such as those created intentionally when wrapping the fiber around a spool or pulling it around a corner, causes the light to be transmitted outside the fiber.

Trapped rays proceed through a step index fiber striking at core-cladding interface 30 at an angle $\Theta_1 > \Theta_2$ so total reflection occurs. The same ray enters the bend and strikes the interface at an angle $\Theta_2$, which is clearly less than $\Theta_1$ and may be less than the critical angle. The angle diminishes as the bend radius R deceases and at some radius, $\Theta_2$ becomes less than the critical angle and total reflection does not occur and a portion of the beam is radiated out of the fiber. This leakage of the light when the optical fiber is bent is the basis for the emission of light in one of the present invention's embodiments.

There are three common types of fiber manufactured. They are all-glass fibers (core and cladding are both glass), plastic coated Silica (PCS) and all-plastic fiber.

The glass materials have close indices and have a high purity. This allows light to be trapped and transmit better down the fiber.

PCS fibers have higher losses than all-glass fibers. The ratio of the indices is greater which helps increase the coupling efficiency of the light into the fiber. PCS fibers are normally suitable choices when the path lengths are less than a few hundred meters. Preferably, core diameters are typically around 200 mm. The large core diameter improves source coupling efficiency and also allows higher order modes to propagate.

All plastic fibers are limited to very short paths by their high propagation losses, usually less than 30–40 meters. Coupling efficiency is very high and they have cores up to 1 mm.

FIGS. 4A and 4B are perspective views of an embodiment of the invention.

The improved hose 40 of this embodiment is meant to connect the tanker refueler 41 with the receiver aircraft 45. Hose 40 has attached to one end, engagement drogue 42 which is intended to align and mate with engagement probe 44 located on receiver aircraft 45 (not shown). Hose 40 is substantially black or dark in color with translucent bands 43 extending around it.

Translucent bands 43 are used by the pilots in engaging receiver probe 45 with engagement drogue 42.

The construction of hose 40 is illustrated in FIG. 4B. Fuel hose tube 36 is surrounded by a hose-reinforcement member 38 which is itself surrounded by a dark tie gum 37. Optical fiber bundle 47 is wound around the dark tie gum 37 until translucent section 43 is encountered.

Each translucent section 43 is structured to assist the pilots in maneuvering to engage hose 40. In this embodiment, translucent bands 43 are constructed of an optical fiber pattern 48 covered by a fresnel film 49. This arrangement is used to create a light pattern to assist in the positioning activity of the pilots.

As noted earlier, selective colors using black and white are used to assist the pilot in positioning of the aircraft to mate with the refueling hose. By placing a fresnel film 49 over each band on the hose, the pilot is able to judge his approach by the visible light. The fresnel film is used to enhance the light.

A dark outer cover 39 surrounds the entire assemblage except for fresnel film 49, thereby permitting light from the optical fiber pattern 48 to shine through.

Terminating optical fibers 35 are located on an interior wall of the hose and provide illumination therein. This illumination is preferably located proximate to the ends and is used to further assist the operators in orienting the hose during docking.

FIG. 5 is an end view of an embodiment of the invention showing the embodiment's use of colors for alignment of the hose during the coupling operation.

By placing the colored lights in quadrants around the hose 40, variations in the emitted light are created which assist in the positioning process for the pilot.

Creating four quadrants of "pure" colors being white 50A, red 50B, yellow 50C, and blue 50D permits a total of eight color references being generated. The "combined" colors then are also visible and useful for the pilot, being: white/blue 51A, pink 51B, orange 51C, and green 51D.

Those of ordinary skill in the art readily recognize that various other colors could also be used and combined.

In this fashion, if the pilot must move his aircraft to the port and upward, the color which would be visible would be red 50B. As the pilot reaches the point directly beneath hose 40, the perceived color would be pink 51B. Positioning thereby becomes a simple exercise in recognizing the colors and their "required movement" significance.

Figure 6:
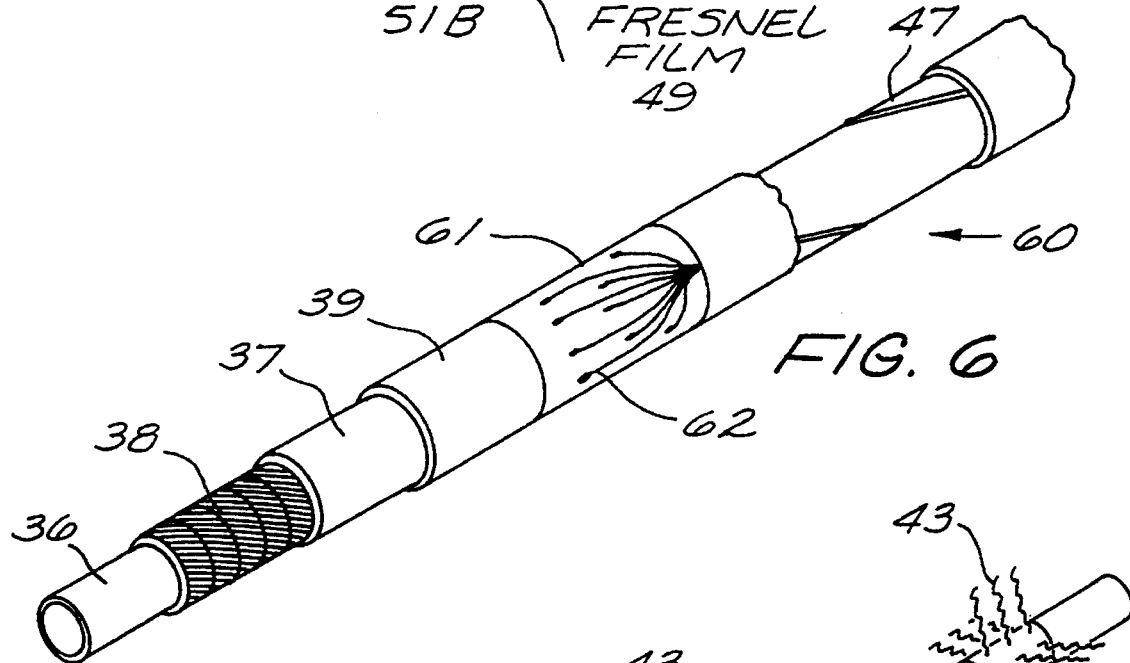
FIG. 6 is a perspective view of an embodiment of the invention showing the use of terminated fibers for illuminating the hose.

FIG. 6 is a perspective view of an embodiment of the invention showing the use of terminated fibers for illuminating the hose.

Again, hose 60 has a center section of: fuel hose tube 36, hose reinforcement 38, and dark tie gum 37. Around this center section is would optical fiber bundle 47. In this embodiment, selected fibers within each bundle are terminated 62 within prescribed portions of the hose 60. At the terminated ends of the fibers 62, are located miniature reflectors 61 which are use to direct and intensify the light escaping from the ends of the fibers.

These miniature reflectors 61 are contained within a clear covering so that the light from the fibers 62 are visible and not covered by the dark outer cover 39.

Figure 7:
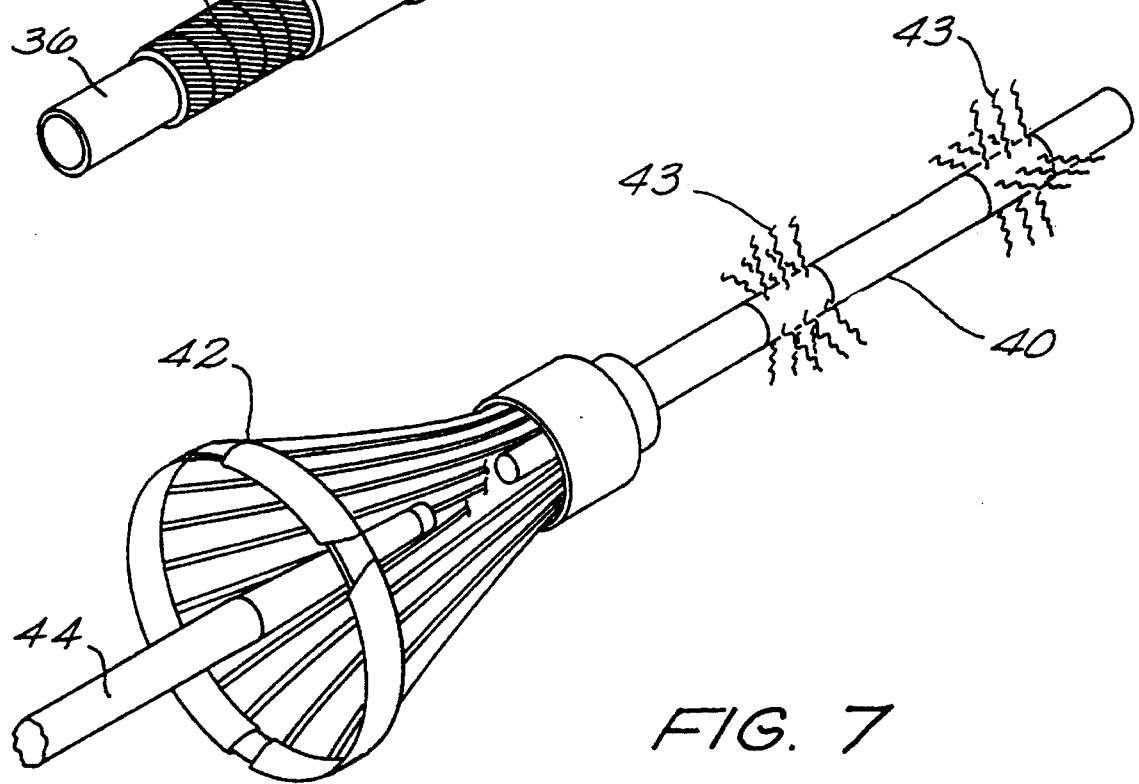
FIG. 7 is a perspective view of an embodiment of the invention as used in aerial refueling showing the drogue.

FIG. 7 is a perspective view of an embodiment of the invention as used in aerial refueling showing the drogue.

As the pilot maneuvers engagement probe 44 into drogue 42, lights 43, emitting from hose 40, are used to gauge distance and angle. This arrangement significantly eases the pilot's burden during night refueling while minimizing the "attraction" of the enemy. Light 43 is of such a low intensity that, while still readily visible to the pilot, it cannot be used by the enemy for targeting of the refueling operation. The intensity of the light (glow) is altered by varying the intensity of the light source.

FIGS. 8A and 8B illustrate an embodiment of the apparatus used to engineer and design a light box used to release light from the fiber-optic fibers.

FIG. 8A shows an embodiment for engineering the curvature requirements and measuring light emissions.

The light source in this embodiment is a calibrated xenon light source 82 which directs its beam of light via multimode connector 82 into optical fiber 80. Optical fiber 80 transmits the light to light box 86 where the light is contained.

Within light box 86, optical fiber 80 is coiled around pins 83. The curvature around pins 83 is such that light escapes from the optical fiber 80 resulting in the emission of light from the light box 86.

Meter 85 is used to determine the level of light being emitted within the box. By varying the diameter of pins 83 and adjusting the light intensity from light source 82, the required parameters which must be engineered into the hose assembly are established.

Once these parameters have been determined, as shown in FIG. 8B, optical fiber 87 is embedded into an elastomeric plaque 87. In this embodiment, the preferred dimensions for the elastomeric plaque 87 are a quarter inch thick by six inches square.

FIG. 9 shows an apparatus used to evaluate varying luminescent materials to be used in manufacture of the light emitting apparatus.

The material in question, 91 is placed to receive light from three different xenon light sources 93A, 93B, and 93C. Each light source is positioned to address panel 91 at varying angles (e.g. light source 93A is at 90 degrees; light source 93B is at 60 degrees; etc.).

Light shield 90 is used to isolate optical power meter 92 from stray light contamination.

By sequencing through the differing light sources 93 and monitoring the power received by the optical power meter 92, the engineering evaluation of panel 91 is expedited and suitable materials can be chosen.

FIGS. 10 illustrates a production embodiment used in the manufacture of the invention.

Mold 104 is composed of a top portion 104A and bottom portion 104B. Mold 104 is heated through the use of steam which is piped into mold 104 via inlets 101A and 101B. The steam heats mold 104 as it weaves through the mold, not shown, and exits via outlets 103A and 103B.

Contained within mold 104 is hose section 102 mounted on a mandrel. In this manner the hose section is both formed and shaped.

FIG. 11 graphically illustrates the improved hose used in aerial refueling.

Refueling aircraft 110 contains a reservoir containing fuel (not shown) which is connected to hose 40. Hose 40 is unwound from aircraft 110 so that the target aircraft 111 is able to engage its probe with drogue 42 and transfer the fuel to its fuel tanks (also not shown).

Translucent sections 43 are used by the pilot of aircraft 111 in positioning for engaging drogue 42.

FIGS. 12A, 12B, and 12C graphically illustrates the improved hose used in ship-to-ship, ship-to-buoy, and ship-to-shore, respectively, fluid transfer.

In a like manner as described relative to FIG. 11, ship 121 receives liquids from ship 122 in an at-sea transfer. In this illustration, hose 40 is used to transfer fuel; alternate hoses transfer or other liquids such as water.

Because of the relative motion of ship 121 to ship 122, the translucent panels 43 are useful in maintaining the proper positioning of the two boats.

Further, the illuminated sections of hose 40 warn other ships of the hose's location, thereby reducing the possibility of hose damage, fuel spills, fire, explosion, etc. As with the aerial refueling application, the encapsulated fiber optics in the hose body are also useful for secure communications once hose 40 is connected.

In FIG. 12B, hose 40 is used to connect ship 123 with buoy 124. Buoy 124 is used for a variety of liquid transfers including fuel and water. Hose 40, in this application, floats on the surface of the water (not shown).

In similar manner, FIG. 12C illustrates the use of hose 40 to transfer liquids between ship 125 and fuel tanks 126.

FIG. 13 graphically illustrates an embodiment of the present invention used in an underwater application.

Diver 131 is supplied air and support by ship 132. Hose 133 is constructed as discussed before with one end, 134, illuminated to assist diver 131 in locating hose 133 and in using hose 134.

This embodiment is particularly useful for murky, muddy, or deep diving applications where ambient light is severely limited.

It is clear from the foregoing that the present invention creates a highly improved illuminated hose and system for using the hose.

What is claimed is:

1. An illuminated hose comprising:
   a) a combination including,
      1) a hose member having a first end and a second end, said hose member also having an interior wall and an exterior wall, and,
      2) a plurality of fiber-optic fibers embedded between said interior wall and said exterior wall of said hose member, a first end of said fiber-optics fibers extending from said exterior wall of said hose member substantially at said first end of said hose member, said fiber-optic fibers further being selectively exposed at predefined locations on said exterior wall of said hose member and structured to permit internally transmitted light within the fiber-optic fibers to escape from a portion of said fiber-optic fibers; and,
   b) a light source emitting light, said light being focussed on said first end of said fiber-optic fibers for transmission of light into said fiber-optic fibers.

2. The illuminated hose according to claim 1 further including means for varying a frequency of light escaping from said fiber-optic fibers.

3. The illuminated hose according to claim 2 wherein said means for varying includes means for creating four separate frequencies, each separate frequency being visible to an operator at a different quadrant around said hose member.

4. The illuminated hose according to claim 1 wherein said predefined locations are shaped to encircle said hose member.

5. The illuminated hose according to claim 1 wherein selected ones of fiber-optic fibers terminate at said predefined locations on said exterior wall of said hose member.

6. The illuminated hose according to claim 1 wherein said fiber-optic fibers include an inner core surrounded by a cladding and wherein selected ones of said fiber-optic fibers have their cladding removed at said predefined locations on said exterior wall of said hose member.

7. The illuminated hose according to claim 1 wherein selected ones of said fiber-optic fibers are radically bent at said predefined locations on said exterior wall.

8. The illuminated hose according to claim 7 wherein selected ones of said fiber-optic fibers terminate along an interior wall of said hose member proximate to said second end.

9. The illuminated hose according to claim 8 wherein said light source includes means for adjusting light intensity focussed on said first end of said fiber-optic fibers.

10. An improved hose comprising:
    a) a hose member having a first end and a second end, said hose member also having an interior wall and an exterior wall; and,
    b) a plurality of fiber-optic fibers embedded between said interior wall and said exterior wall of said hose member, a first end of said fiber-optics fibers extending from said hose member proximate to said first end of said hose member, said fiber-optic fibers further being selectively exposed at predefined locations on said exterior wall of said hose member and structured to permit an internally transmitted light within the fiber-optic fibers to escape from a portion of said fiber-optic fibers.

11. The illuminated hose according to claim 10 further including means for varying a frequency of light escaping from said fiber-optic fibers.

12. The illuminated hose according to claim 11 wherein said means for varying includes means for creating four separate frequencies being visible to an operator at a different quadrant around said hose member.

13. The improved hose according to claim 12 wherein said predefined locations are shaped to encircle said hose member.

14. The improved hose according to claim 13 wherein selected ones of fiber-optic fibers terminate at said predefined locations on said exterior wall of said hose member.

15. The improved hose according to claim 13 wherein said fiber-optic fibers include an inner core surrounded by a cladding and wherein selected ones of said fiber-optic fibers have their cladding removed at said predefined locations on said exterior wall of said hose member.

16. The improved hose according to claim 13 wherein selected ones of said fiber-optic fibers are radically bent at said predefined locations on said exterior wall.

17. The improved hose according to claim 13 wherein selected ones of said fiber-optic fibers terminate along an interior wall of said hose member proximate to said second end.

18. A fuel transfer system comprising:
    a) a reservoir containing fuel;
    b) a target vehicle having a fuel tank therein, said target vehicle being proximate to said reservoir;
    c) a hose extending from said reservoir to the fuel tank of said target vehicle, said hose having, 1) a hose member having a first end attached to said reservoir and a second end attachable, to said fuel tank of the target vehicle for passage of fuel therebetween, said hose member also having an interior wall and an exterior wall, and, 2) a plurality of fiber-optic fibers embedded in said hose member, a first end of said fiber-optic fibers extending from said hose member proximate to said first end of said hose member, said fiber-optic fibers further being selectively exposed through said exterior wall of said hose member at predefined locations and structured to permit internally transmitted light within the fiber-optic fibers to escape from a portion of said fiber-optic fibers; and, d) a light source located proximate to said reservoir and for emitting light, said light being focussed on said first end of said fiber-optic fibers for transmission of light into said fiber-optic fibers.

19. The fuel transfer system according to claim 18 wherein relative motion between said reservoir and said target vehicle occurs during passage of fuel through said hose member.

20. The illuminated hose according to claim 19 further including means for varying a frequency of light escaping from said fiber-optic fibers.

21. The illuminated hose according to claim 20 wherein said means for varying includes means for creating four separate frequencies, each separate frequency being visible to an operator at a different quadrant around said hose meter.

22. The fuel transfer system according to claim 20 wherein said reservoir is mounted on an aircraft and wherein said target vehicle is also an aircraft.

23. The fuel transfer system according to claim 20 wherein said targeted vehicle is a ship.

24. The fuel transfer system according to claim 23 wherein said reservoir is mounted on a ship.

25. The fuel transfer system according to claim 20 wherein said predefined locations are shaped to encircle said hose member.

26. The fuel transfer system according to claim 25 wherein selected ones of fiber-optic fibers terminate at said predefined locations on said exterior wall of said hose member.

27. The fuel transfer system according to claim 25 wherein said fiber-optic fibers include an inner core surrounded by a cladding and wherein selected ones of said fiber-optic fibers have their cladding removed at said predefined locations on said exterior wall of said hose member.

28. The fuel transfer system according to claim 25 wherein selected ones of said fiber-optic fibers are radically bent at said predefined locations on said exterior wall.

29. The fuel transfer system according to claim 25 wherein selected ones of said fiber-optic fibers terminate along an interior wall of said hose member proximate to said second end.

30. The fuel transfer system according to claim 25 wherein said light source includes means for adjusting light intensity focussed on said first end of said fiber-optic fibers.

* * * * *